US012572599B2

(12) United States Patent
Kinnear et al.

(10) Patent No.: US 12,572,599 B2
(45) Date of Patent: Mar. 10, 2026

(54) SYSTEMS AND METHODS OF GENERATING DYNAMIC ASSOCIATIONS BASED ON USER OBJECT ATTRIBUTES

(71) Applicant: Alegeus Technologies, LLC, Boston, MA (US)

(72) Inventors: Kyle Kinnear, Whitefish Bay, WI (US); Lillian Liu, Menomonee Falls, WI (US); Timothy Smart-Dumouchel, West Bend, WI (US); Erick Anderson, Eagle, WI (US); Wilker Shane Bruce, Clearwater, FL (US); Jonathan David Reese, West Bend, WI (US); Kristina Ann Saunders, South Lake Tahoe, CA (US)

(73) Assignee: Alegeus Technologies, LLC, Boston, MA (US)

( * ) Notice: Subject to any disclaimer, the term of this patent is extended or adjusted under 35 U.S.C. 154(b) by 188 days.

(21) Appl. No.: 18/091,071

(22) Filed: Dec. 29, 2022

(65) Prior Publication Data

US 2023/0214426 A1 Jul. 6, 2023

Related U.S. Application Data

(60) Provisional application No. 63/295,024, filed on Dec. 30, 2021.

(51) Int. Cl.
*G06Q 10/10* (2023.01)
*G06F 16/901* (2019.01)
(Continued)

(52) U.S. Cl.
CPC ..... *G06F 16/9027* (2019.01); *G06Q 10/1057* (2013.01)

(58) Field of Classification Search
CPC G06F 16/9027; G06Q 10/1057; G06Q 40/08; G16H 10/60
(Continued)

(56) References Cited

U.S. PATENT DOCUMENTS 8,234,222 B2 * 7/2012 Thompson ............. G06Q 40/04
705/320
8,799,023 B2 * 8/2014 White ................ G06Q 30/0207
705/2
(Continued)

*Primary Examiner* — Jonathan P Ouellette
(74) *Attorney, Agent, or Firm* — Foley & Lardner LLP

(57) ABSTRACT

Example implementations include a system to generate a user object, with a data processing system comprising memory and one or more processors to identify a role attribute of a user object, a geography attribute of the user object, and a temporal attribute of the user object, determine, based on the role attribute, the geography attribute, and the temporal attribute, a benefits group corresponding to the user object, generate a dynamic association of the user object to the benefits group, the dynamic association from the role attribute, the geography attribute, and the temporal attribute, and modifiable in response to a modification of one or more of the role attribute, the geography attribute, and the temporal attribute, and generate a dynamic tree structure from the dynamic association, the tree structure modifiable in response to the modification of one or more of the role attribute, the geography attribute, and the temporal attribute.

20 Claims, 12 Drawing Sheets

100

(51) Int. Cl.

| | |
|---|---|
| *G06Q 10/105* | (2023.01) |
| *G06Q 10/1057* | (2023.01) |
| *G06Q 30/02* | (2023.01) |

(58) Field of Classification Search
USPC ................................................. 705/1.1, 322
See application file for complete search history.

(56) References Cited

U.S. PATENT DOCUMENTS

| | | | | |
|---|---|---|---|---|
| 9,524,525 | B2 * | 12/2016 | Manyam ................ | G06Q 40/08 |
| 10,282,785 | B1 * | 5/2019 | Yager ..................... | G06Q 30/02 |
| 11,165,785 | B1 * | 11/2021 | Karppanen ........... | H04L 63/104 |
| 2001/0037223 | A1 * | 11/2001 | Beery ................... | G06F 16/972 |
| | | | | 707/E17.117 |
| 2011/0040793 | A1 * | 2/2011 | Davidson ................ | G06F 16/21 |
| | | | | 707/E17.005 |
| 2016/0019250 | A1 * | 1/2016 | Kumar ................ | G06F 16/2291 |
| | | | | 707/740 |
| 2016/0098792 | A1 * | 4/2016 | Hahn ..................... | G06Q 40/00 |
| | | | | 705/38 |

* cited by examiner

400

172

1200

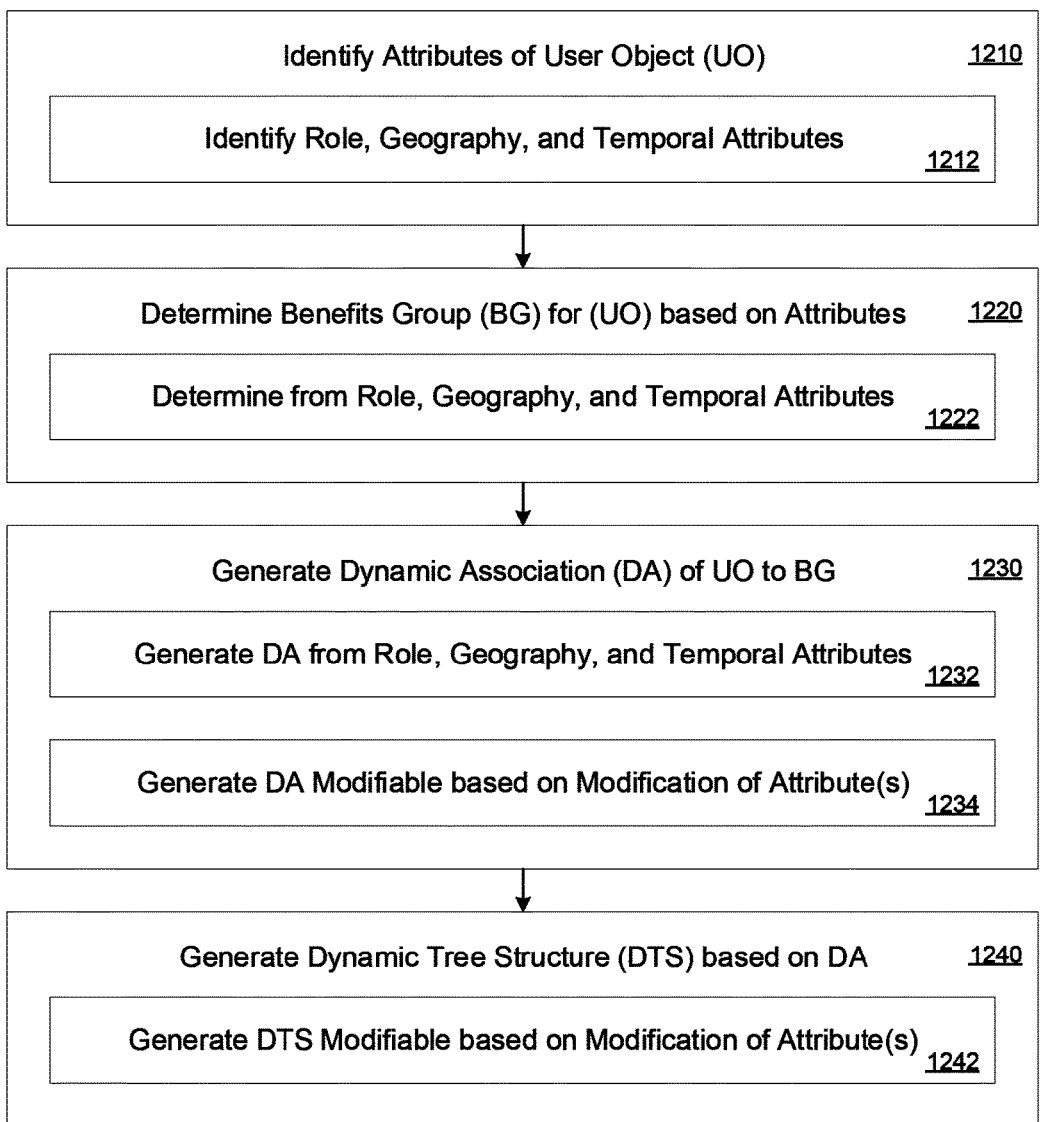

Identify Attributes of User Object (UO)                1210

Identify Role, Geography, and Temporal Attributes        1212

Determine Benefits Group (BG) for (UO) based on Attributes        1220

Determine from Role, Geography, and Temporal Attributes        1222

Generate Dynamic Association (DA) of UO to BG        1230

Generate DA from Role, Geography, and Temporal Attributes        1232

Generate DA Modifiable based on Modification of Attribute(s)        1234

Generate Dynamic Tree Structure (DTS) based on DA        1240

Generate DTS Modifiable based on Modification of Attribute(s)        1242

Fig. 12

SYSTEMS AND METHODS OF GENERATING DYNAMIC ASSOCIATIONS BASED ON USER OBJECT ATTRIBUTES

CROSS-REFERENCE TO RELATED PATENT APPLICATIONS

This application claims the benefit of priority under 35 U.S.C. § 119 to U.S. Provisional Patent Application Ser. No. 63/295,024, entitled "SYSTEMS AND METHODS OF GENERATING DYNAMIC ASSOCIATIONS BASED ON USER OBJECT ATTRIBUTES," filed Dec. 30, 2021, the contents of such application being hereby incorporated by reference in its entirety and for all purposes as if completely and fully set forth herein.

TECHNICAL FIELD

The present implementations relate generally to digital healthcare infrastructure, and more particularly to generating dynamic associations based on user object attributes.

BACKGROUND

Participants of a health care program can conduct an electronic transaction for goods or services. Due to the large number of available sources for goods or services, and the varying parameters associated with electronic transactions, it can be challenging to efficiently and accurately quantify value of a source for the goods or services rapidly enough to execute without wasting resource utilization or introducing latency or delays that may make goods or services impossible to execute timely.

SUMMARY

In some arrangements, a system to generate a user object includes a data processing system including memory and one or more processors to identify a role attribute of a user object, a geography attribute of the user object, and a temporal attribute of the user object, determine, based on the role attribute, the geography attribute, and the temporal attribute, a benefits group corresponding to the user object, generate a dynamic association of the user object to the benefits group, the dynamic association based on the role attribute, the geography attribute, and the temporal attribute, and modifiable in response to a modification of one or more of the role attribute, the geography attribute, and the temporal attribute, and generate a dynamic tree structure based on the dynamic association, the tree structure modifiable in response to the modification of one or more of the role attribute, the geography attribute, and the temporal attribute.

In some arrangements, the data processing system can modify the dynamic association, in response to a determination that the role attribute does not satisfy the geography attribute, and modify the dynamic tree structure, in response to the determination that the role attribute does not satisfy the geography attribute.

In some arrangements, the data processing system can modify the dynamic association, in response to a determination that the role attribute does not satisfy the temporal attribute, and modify the dynamic tree structure, in response to the determination that the role attribute does not satisfy the temporal attribute.

In some arrangements, the role attribute corresponds to an employee classification.

In some arrangements, the role attribute corresponds to a union classification.

In some arrangements, the geography attribute corresponds to a government jurisdiction.

In some arrangements, the temporal attribute corresponds to an effective date of a benefit year associated with the benefits group.

In some arrangements, the temporal attribute corresponds to an effective date of legislation associated with the benefits group.

In some arrangements, the data processing system can identify a first rank associated with the geography attribute and a second rank associated with the temporal attribute, in response to a determination that the geography attribute conflicts with the temporal attribute, modify the dynamic association in accordance with the geography attribute, in response to a determination that the first rank is greater than the second rank, and modify the dynamic tree structure in accordance with the geography attribute, in response to the determination that the first rank is greater than the second rank.

In some arrangements, the data processing system can modify the dynamic association in accordance with the temporal attribute, in response to a determination that the first rank is not greater than the second rank, and modify the dynamic tree structure in accordance with the temporal attribute, in response to the determination that the first rank is not greater than the second rank.

In some arrangements, the data processing system can identify a first rank associated with the geography attribute and a second rank associated with a second geography attribute of the user object, in response to a determination that the geography attribute conflicts with the second geography attribute, modify the dynamic association in accordance with the geography attribute, in response to a determination that the first rank is greater than the second rank, and modify the dynamic tree structure in accordance with the geography attribute, in response to the determination that the first rank is greater than the second rank.

In some arrangements, the data processing system can modify the dynamic association in accordance with the second geography attribute, in response to a determination that the first rank is not greater than the second rank, and modify the dynamic tree structure in accordance with the second geography attribute, in response to the determination that the first rank is not greater than the second rank.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 12 depicts a method of generating dynamic associations based on user object attributes, in accordance with present implementations.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components for understanding the present implementations are described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Present implementations are directed to computational processing, computational hardware, and user interfaces. Present implementations can include user interfaces and data structures directed at least to Employee Field, Employee Groups, Plan, Composite & Member-level Rates, Coverage implementations. Present implementations can include an Employee Group Determination implementation. Data structures can include an employer structure and personalized rate tables. As one example, an Employer Structure can include an Employee Field and Employee Group. As another example, Personalized Rate Tables can be associated with COBRA Coverage metrics under the Personalized Rate Tables section and be associated with Rate Table and Plan implementations for determining costs.

Appendix A-F are appended to this specification and are hereby incorporated by reference herein into the specification for all intents and purposes. The systems, methods, functions, flows, and graphical user interfaces depicted in any one of Appendix A-F can be performed using the systems, components, or functions depicted in FIGS. 1-10.

Figure 1:
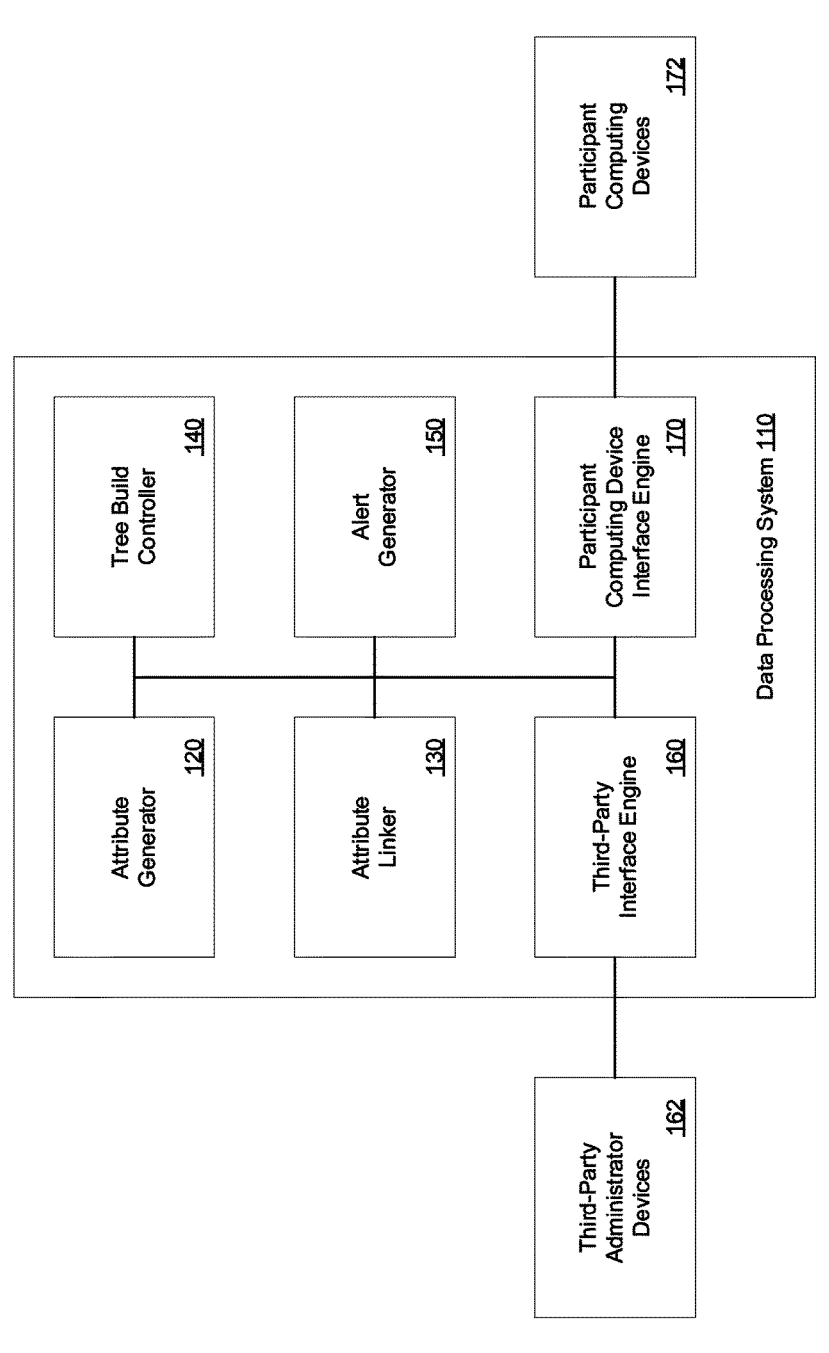
FIG. 1 depicts a system in accordance with present implementations.

FIG. 1 depicts a system in accordance with present implementations. As illustrated by way of example in FIG. 1, an example system 100 can include a data processing system 110 operable to communicate with one or more third-party administrator devices 162 and one or more participant computing devices 172. The data processing system 110 can include an attribute generator 120, an attribute linker 130, a tree build controller 140, an alert generator 150, a third-party interface engine 160, and a participant computing device interface engine 170. Each of the attribute generator 120, the attribute linker 130, the tree build controller 140, the alert generator 150, the third-party interface engine 160, and the participant computing device engine 170 can respectively include one or more logical or electronic devices including but not limited to integrated circuits, logic gates, flip flops, gate arrays, programmable gate arrays, and the like.

The third-party interface engine 160 and the participant computing device interface engine 170 can respectively include network interfaces or the like compatible respectively with one or more types of third-party administrator devices 162 or one or more types of participant computing devices 172. The communication interface third-party interface engine 160 and the participant computing device interface engine 170 can communicatively couple the data processing system 110 to an external device. An external device can include, but is not limited to, a smartphone, mobile device, wearable mobile device, tablet computer, desktop computer, laptop computer, cloud server, local server.

The third-party interface engine 160 and the participant computing device interface engine 170 can communicate one or more instructions, signals, conditions, states, or the like between one or more of the data processing system 110 and components, devices, blocks operatively coupled or that can be coupled therewith. The third-party interface engine 160 and the participant computing device interface engine 170 can include one or more digital, analog, or like communication channels, lines, traces, or the like. As one example, the third-party interface engine 160 and the participant computing device interface engine 170 can include at least one serial or parallel communication line among multiple communication lines of a communication interface. The third-party interface engine 160 and the participant computing device interface engine 170 can include one or more wireless communication devices, systems, protocols, interfaces, or the like. The third-party interface engine 160 and the participant computing device interface engine 170 can include one or more logical or electronic devices including but not limited to integrated circuits, logic gates, flip flops, gate arrays, programmable gate arrays, and the like. The third-party interface engine 160 and the participant computing device interface engine 170 can include one or more telecommunication devices including but not limited to antennas, transceivers, packetizers, and wired interface ports. The third-party administrator devices 162 can include external systems with heterogeneous communication protocols and interfaces. The participant computing devices 172 can include external systems with heterogeneous communication protocols and interface distinct from those of the third-party administrator devices 162.

Figure 2:
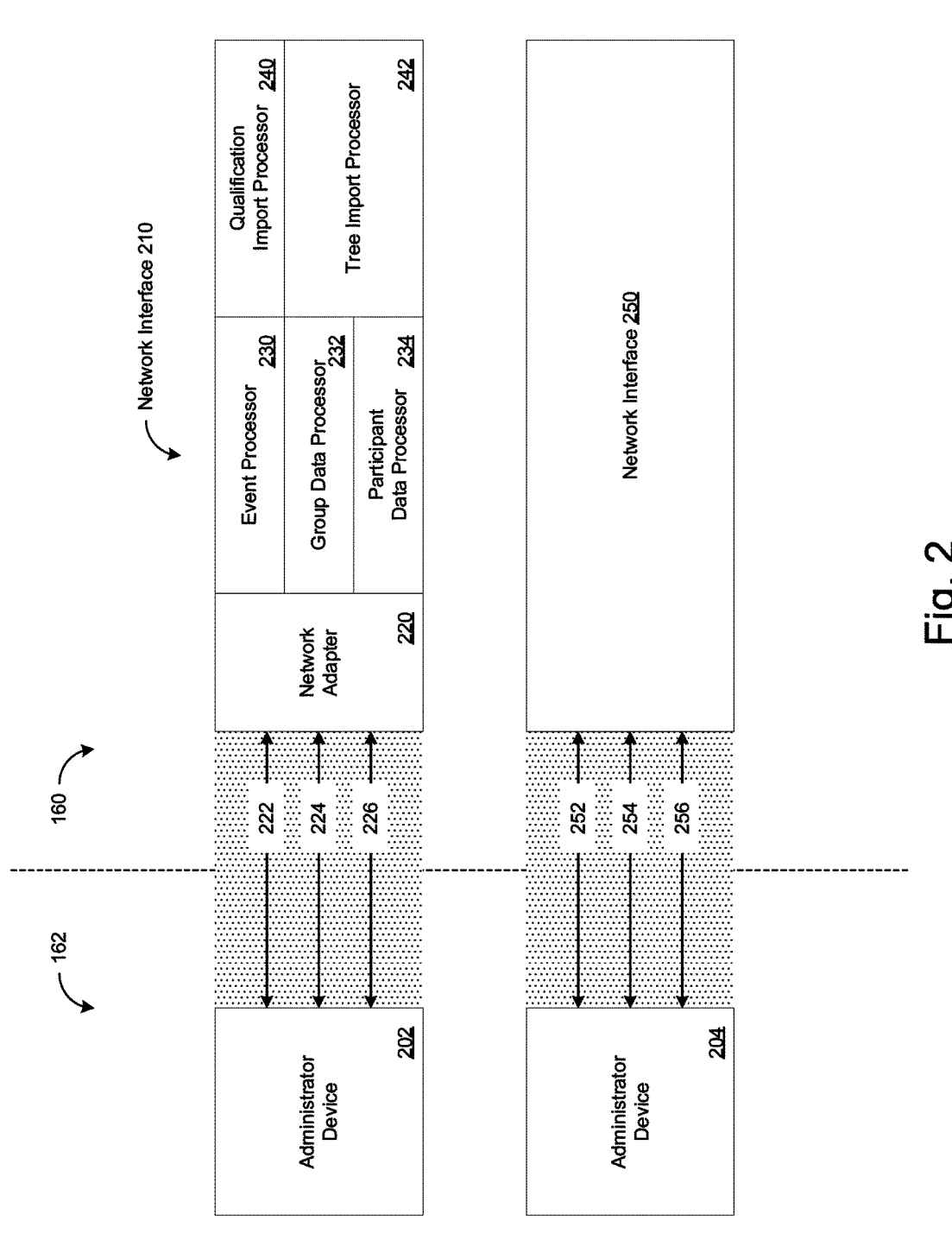
FIG. 2 depicts an interface architecture, in accordance with present implementations.

FIG. 2 depicts an example interface architecture, in accordance with present implementations. As illustrated by way of example in FIG. 2, an example interface architecture 200 can include at least an administrator device 202, an administrator device 204, a network interface 210, and a network interface 250. The architecture 200 is not limited to the particular number and arrangement of interfaces depicted by way of example herein.

The administrator device 202 can correspond at least partially in one or more of structure and operation to one of the third-party administrator devices 162. The administrator device 202 can be external to the data processing system 110, and can be configured to be coupled with the data processing system 110 by the network interface 210. The administrator device 202 can communicate unidirectionally or bidirectionally with the network interface 210 by one or more interface channels. For example, the administrator device 202 can correspond to a first provider system storing data corresponding to one or more participants and groups. For example, the administrator device 202 can be configured to be compatible with the first network interface 210, based on a first protocol compatible to transmit communication corresponding to one or more of the participants and groups stored at the administrator device 202. For example, the administrator device 202 can be configured to restrict or block communication corresponding to one or more protocols different than the first protocol compatible to transmit communication corresponding to one or more of the participants and groups stored at the administrator device 202.

The administrator device 204 can correspond at least partially in one or more of structure and operation to the administrator device 202. For example, the administrator device 204 can correspond to a second provider system storing data corresponding to one or more participants and groups. For example, the administrator device 204 can be configured to be compatible with the second network interface 250, based on a second protocol compatible to transmit communication corresponding to one or more of the participants and groups stored at the administrator device 204. For example, the administrator device 204 can be configured to restrict or block communication corresponding to one or more protocols different than the second protocol compatible to transmit communication corresponding to one or more of the participants and groups stored at the administrator device 202.

The network interface 210 can communicate with the administrator device 202 by one or more protocols and channels compatible with the administrator device 202. For example, the network interface 210 can be restricted to communicate with one or more administrator devices 202 compatible with a particular protocol. The network interface 210 can include a network adapter 220, an event processor 230, a group data processor 232, a participant data processor 234, a qualification import processor 240, and a tree import processor 242.

The network adapter 220 can establish, maintain, modify, and terminate one or more interface channels with the administrator device 202. For example, the network adapter 220 can be configured to select one or more ports, application programming interfaces (APIs), encoders, decoders, or any combination thereof, based on one or more characteristics of the administrator device 202 or characteristics of participants, groups, or plans, or any combination thereof, stored at the administrator device 202. The network adapter 220 can include an event interface channel 222, a group interface channel 224, and a participant interface channel 226.

The event interface channel 222 can establish, maintain, modify, and terminate a communication path by a first selected port, application programming interface (API), encoder, decoder, or any combination thereof, based on one or more characteristics of the administrator device 202 or characteristics of participants, groups, or plans, or any combination thereof, stored at the administrator device 202. The event interface channel 222 can be confirmed to receive notifications, alerts, push communications, or transmit polling requests, for example, to receive an indication of a change, addition, or removal of a characteristic of one or more participants, groups, or plans, or any combination thereof. For example, the network adapter 220 can establish and maintain the event interface channel 222 according to a first secure protocol configured to receive indications of change in state of characteristics and exclude transmission of content of participants, groups, or plans. For example, the event interface channel 222 can receive an indication of a change in status of a particular identifier associated with a participant, without transmission of characteristics of the participant including name or social security number.

The group interface channel 224 can establish, maintain, modify, and terminate a communication path by a second selected port, application programming interface (API), encoder, decoder, or any combination thereof, based on one or more characteristics of the administrator device 202 or characteristics of groups or plans, or any combination thereof, stored at the administrator device 202. The group interface channel 224 can be confirmed to receive indications or objects corresponding to characteristics of one or more groups or plans, or any combination thereof. For example, an object can correspond to a JSON object, binary object, cryptographic token, or any combination thereof. For example, the network adapter 220 can establish and maintain the group interface channel 222 according to a second secure protocol configured to receive objects corresponding to groups or plans and exclude transmission of content of participants or events. For example, the group interface channel 224 can be configured to be compatible with a security protocol corresponding to a security perimeter based on one or more communication parameters of the administrator device 202.

The participant interface channel 226 can establish, maintain, modify, and terminate a communication path by a third selected port, application programming interface (API), encoder, decoder, or any combination thereof, based on one or more characteristics of the administrator device 202 or characteristics of participants stored at the administrator device 202. The participant interface channel 226 can be confirmed to receive indications or objects corresponding to characteristics of one or more participants. For example, an object can correspond to a JSON object, binary object, cryptographic token, or any combination thereof. For example, the network adapter 220 can establish and maintain the participant interface channel 226 according to a third secure protocol configured to receive objects corresponding to participants and exclude transmission of content of groups or events. For example, the participant interface channel 226 can be configured to be compatible with a security protocol corresponding to a security perimeter based on one or more of communication parameters of the administrator device 202, and communication parameters of the objects corresponding to the participants. For example, the participant interface channel 226 can correspond to a protocol including a first security encapsulation layer corresponding to a security encapsulation layer of the group interface channel 224, and a second security encapsulation layer corresponding only to the participant interface channel 226. For example, a security encapsulation layer can include an encryption of an object or portion of an object by a particular cryptographic key or process.

The event processor 230 can transform input received from the network adapter 220 corresponding to the event interface channel 222. For example, the event processor 230 can generate an action object corresponding to a particular participant or group based on an indication of change received at the network adapter 220. For example, the event processor 230 can receive indications of changes to participants in accordance with a particular enrollment status of the participant with a group, and can filter or discard events corresponding to those indications. For example, the event processor 230 can receive indications of changes to participants in accordance with a change or removal of a particular enrollment status of the participant with a group, and can forward to the qualification import processor 240 events, participants, or groups corresponding to those indications. For example, the event processor 230 can generate a container including the indication of change of enrollment of a particular participant, and a group associated with the participant, in response to a determination that the indication corresponding to a change in enrollment status of the participant. Thus, the network adapter 220 and the event processor 230 can provide at least the technical improvement of a segmented and secure channel interface with external systems based on the content and structure of data stored at the external system.

The group data processor 232 can transform input received from the network adapter 220 corresponding to the group interface channel 224. For example, the group data processor 232 can generate a group object including identifiers, metrics, or descriptors, for example, of a group. The group data processor 232 can transform input at least as discussed herein, in response to an indication of change received at the network adapter 220. Thus, the network adapter 220 and the group data processor 232 can provide at least the technical improvement of a segmented and secure channel interface with external systems based on the content and structure of data stored at the external system.

The participant data processor 234 can transform input received from the network adapter 220 corresponding to the participant interface channel 226. For example, the participant data processor 234 can generate a participant object including identifiers, metrics, or descriptors, for example, of a participant. The participant data processor 234 can transform input at least as discussed herein, in response to an indication of change received at the network adapter 220. Thus, the network adapter 220 and the participant data processor 234 can provide at least the technical improvement of a segmented and secure channel interface with external systems based on the content and structure of data stored at the external system.

The qualification import processor 240 can generate a qualification object corresponding to input received from the event processor 230. For example, the qualification import processor 240 can generate a qualification object including an identification of a type of qualification event corresponding to the change in enrollment status. For example, the qualification import processor 240 can generate a qualification object including an identification of a corresponding one of an enrollment event, a termination of enrollment event, and a separation type indication. The separation type indication can correspond to an indication or selection by the qualification import processor 240 of a voluntary or involuntary separation by the participant.

The tree import processor 242 can generate a network object corresponding to input received from the group data processor 232. For example, the tree import processor 242 can generate a network object including an identification of multiple participants corresponding to the participant linked with the change in enrollment status indication. For example, the tree import processor 242 can extract an identifier of the participant from a participant object, and can include the participation object or a reference thereto or a portion thereof, in the network object. For example, the tree import processor 242 can transmit a request via the participant data processor 234 to the administrator device 202, to obtain participants linked with the participant object. The tree import processor 242 can receive additional import object from the participant data processor 234 in response to a communication with the administrator device 202 to complete the request by the tree import processor 242. The tree import processor 242 can include the further received participant objects, as dependent participant objects, or a reference thereto or a portion thereof, in the network object.

The network interface 250 can correspond at least partially in one or more of structure and operation to the network interface 210. The network interface 250 can be configured to be compatible with and communicate with the administrator device 204. For example, the network interface 250 can be configured to communicate by one or more interfaces distinct from interfaces of the network interface 210. The network interface 250 can include an event interface channel 252, a group interface channel 254, and a participant interface channel 256. The event interface channel 252 can correspond at least partially in one or more of structure and operation to the event interface channel 222, and can communicate by a protocol or configuration distinct from that of the event interface channel 222. The group interface channel 254 can correspond at least partially in one or more of structure and operation to the group interface channel 224, and can communicate by a protocol or configuration distinct from that of the group interface channel 224. The participant interface channel 256 can correspond at least partially in one or more of structure and operation to the participant interface channel 226, and can communicate by a protocol or configuration distinct from that of the participant interface channel 226.

Figure 3:
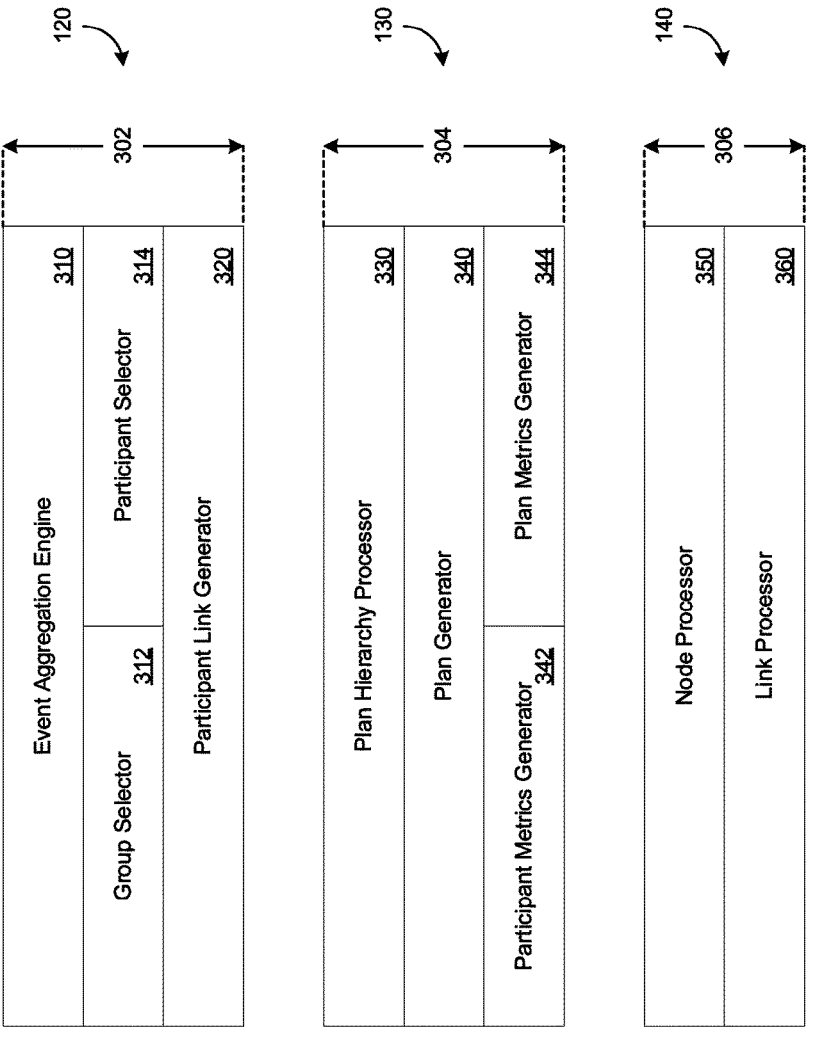
FIG. 3 depicts a system architecture, in accordance with present implementations.

FIG. 3 depicts an example system architecture, in accordance with present implementations. As illustrated by way of example in FIG. 3, an example system architecture 300 can include at least an attribute generator 302, an attribute linker 304, and a tree build controller 306.

The attribute generator 302 can correspond at least partially in one or more of structure and operation to the attribute generator 120. The attribute generator 302 can include an event aggregation engine 310, and a participant link generator 320.

The event aggregation engine 310 can generate one or more aggregation objects including or referencing one or groups or participants corresponding to a particular event. For example, the event aggregation engine can extract one or more groups and participants, including dependent participants, from a network object. The event processor 310 can include a group selector 312 and a participant selector 314. The event aggregation engine 310 can transmit the aggregation object or an instruction based on the aggregation object to one or more of the group selector 312 and the participant selector 314.

The group selector 312 can select a particular group object corresponding to a group of the aggregation object. The group selector 314 can select an identifier corresponding to a particular group of one of the third-party administrator devices 162, or one or more of the third-party administrator devices 162, based on metrics or content of the group object. The participant selector 314 can select an identifier corresponding to a particular participant of one of the third-party administrator devices 162, or one or more of the third-party administrator devices 162, based on metrics or content of the participant object.

The participant link generator 320 can generate one or more links between particular group objects and participant objects, based on content of a network object. For example, participant link generator 320 can generate links among group objects and participant objects obtained by the event aggregation engine 310 that correspond to a hierarchical structure between various participants and various dependent participants and groups.

The attribute linker 304 can correspond at least partially in one or more of structure and operation to the attribute linker 130. The attribute linker 304 can include a plan hierarchy processor 330, and a plan generator 340.

The plan hierarchy processor 330 can identify rankings or hierarchy control levels corresponding to particular group objects obtained by the group selector 312, and can modify one or metrics associates with one or more plans corresponding to a plan. For example, the plan hierarchy processor 330 can identify a first group having a first plan restriction metric and a second group having a second plan restriction metric, where both groups are obtained by the event aggregation engine 310 as corresponding to a participant object. The plan hierarchy processor 330 can identify that the first plan restriction metric overrides the second plan restriction metric, and can link the first group object to the participant object and discard or modify the second group object according to the first plan restriction metric. For example, the plan hierarchy processor 330 can determine that a restriction metric associated with a group plan for a participant having a particular identifier or class identifier, overrides an individual plan for the participant. For example, the group plan can correspond to a union health plan, and the individual plan can correspond to an individual employer plan or public plan.

The plan generator 340 can link one or more participant objects and their corresponding dependent participant objects with a plan corresponding to a group object selected by the plan hierarchy processor. The plan generator 340 can include a participant metrics generator 342, and a plan metrics generator 344.

The participant metrics generator 342 and the plan metrics generator 344 can generate various metrics associated with a participant, and based on one or more of the participant, the participant's group, the participant's plan, or any combination thereof. For example, in the case of a dependent participant object, the participant metrics generator 342 or the plan metrics generator 344 can generate various metrics associated with a participant linked with a dependent participant object. For example, metrics can correspond to a quantitative metric or qualitative metric. For example, a qualitative metric can correspond to a demographic trait, a biometric characteristic, a biographical trait, a plan classification, a plan or service eligibility, a primary care election, a health condition indication, or any combination thereof. For example, a quantitative metric can correspond to a currency, a co-pay, a discount, a deductible, or any combination thereof.

The tree build controller 306 can correspond at least partially in one or more of structure and operation to the tree build controller 140. The tree build controller 306 can include a node processor 350, and a link processor 360. The node processor 350 can generate, modify, or deallocate one or more nodes corresponding to or including objects as discussed herein. The link processor 360 can generate, modify, or deallocate one or more links corresponding to or including references to, form, or between objects as discussed herein.

Figure 4:
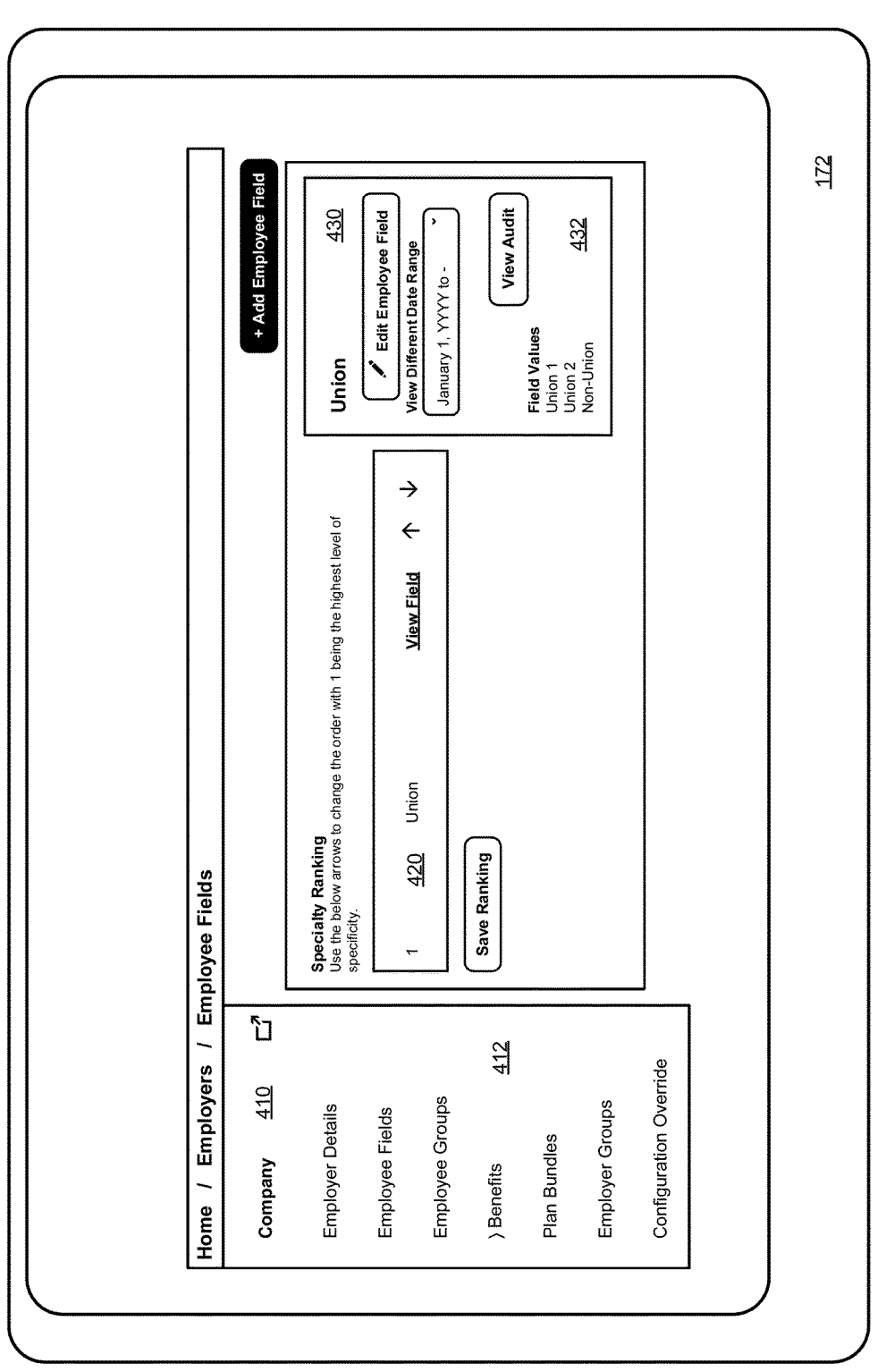
FIG. 4 depicts a user interface, in accordance with present implementations.

FIG. 4 depicts an example user interface, in accordance with present implementations. As illustrated by way of example in FIG. 4, an example user interface 400 can include at least a provider control affordance 410, an activated selection affordance 412, a group link control presentation 420, and a group summary presentation 430.

The provider control affordance 410 can include one or more user interface elements configured to receive input via a user interface of a participant computing device 172. For example, the user interface elements of the provider control affordance 410 cause the user interface 400 to present various metrics corresponding to the user interface element selected via the user interface. For example, the provider control affordance 410 can cause the user interface 400 to present the group link control presentation 420. The activated selection affordance 412 can correspond to a portion of the provider control affordance 410. For example, the activated selection affordance 412 can include a menu item selected via input by the user interface 400.

The group link control presentation 420 can present one or more groups and can present one or more override control affordances associated with one or more corresponding groups. For example, the override control affordance associated with a first group of the group link control presentation 420 can receive input via the user interface 400 corresponding to a modification of an override ranking or override metric of a group. For example, the override control affordance can transmit an indication of a modification of an override metric of a group to lower the ranking of the group in absolute terms or with respect to one or more other groups associated with the group link control presentation 420 or a particular participant. In response, the plan hierarchy processor 330 can obtain the indication of modification, can modify the override for a group, and can generate a plan corresponding to the updated override for that group or that participant, or any combination thereof.

The group summary presentation 430 can present one or more metrics corresponding to a group selected at or active in the group link control presentation 420. The group summary presentation 430 can include a group metrics presentation 432. The group metrics presentation 432 can present one or more metrics corresponding to the group or included in or reference by a particular group object corresponding to a group presented at the group summary presentation 430.

Figure 5:
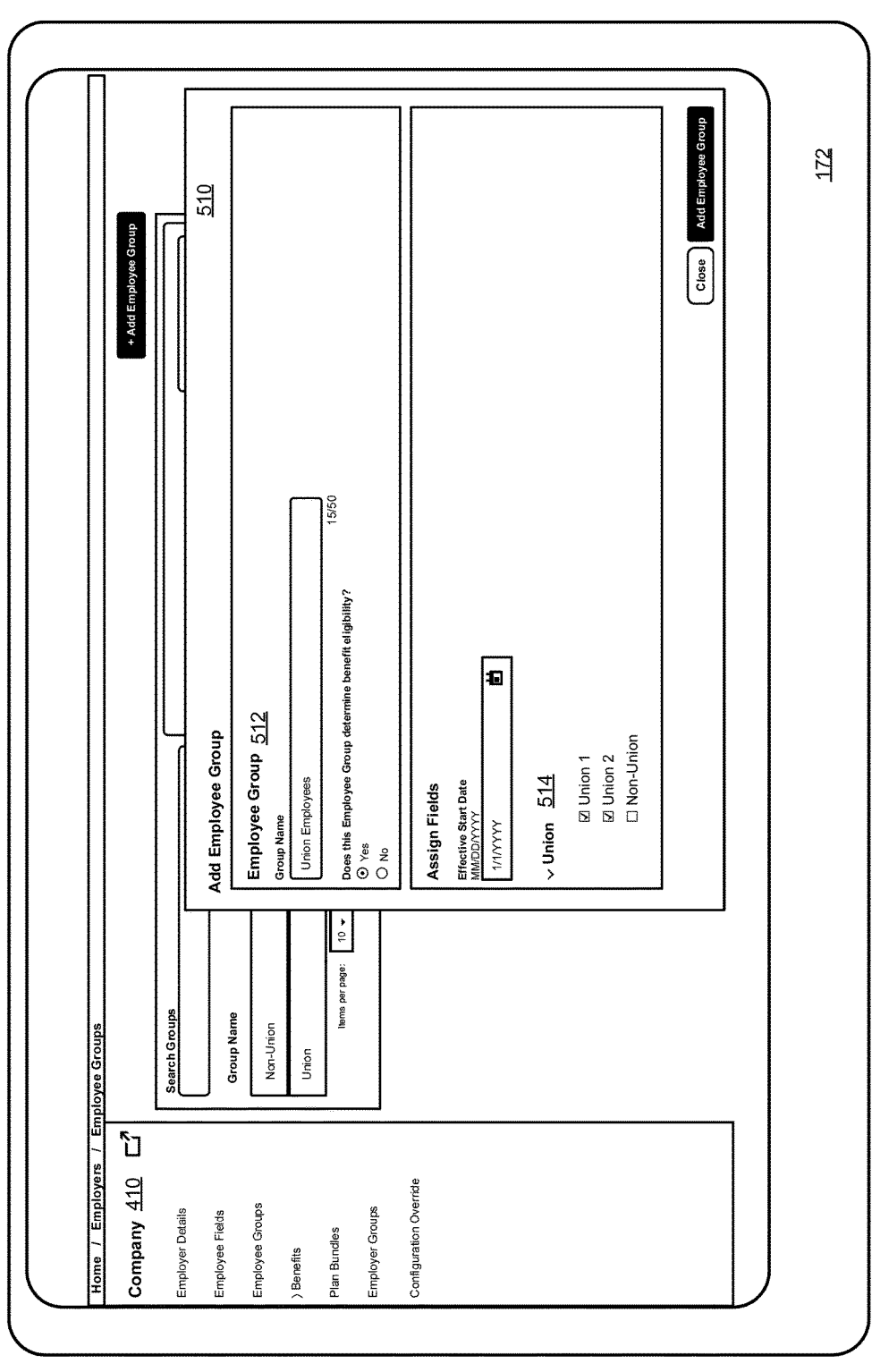
FIG. 5 depicts a user interface, in accordance with present implementations.

FIG. 5 depicts an example user interface, in accordance with present implementations. As illustrated by way of example in FIG. 5, an example user interface 500 can include at least a participant summary presentation 510.

The participant summary presentation 510 can present one or more metrics corresponding to a participant object and can present one or more control affordances to modify one or more metrics corresponding to a participant object. The participant summary presentation 510 can include a group link presentation 512, and a group link control affordance 514. The group link presentation 512 can present one or more groups selected at or active in the participant summary presentation 510. The group link control affordance 514 can present one or more groups and can present one or more link control affordances associated with one or more corresponding groups. For example, the group link control affordance 514 can include a plurality of control affordances each corresponding to a particular group object associated with an entity. For example, a control affordance can include a checkbox indicating a true or false state. For example, an entity can correspond to an employer supporting one or more plans and affiliated with one or more groups.

Figure 6:
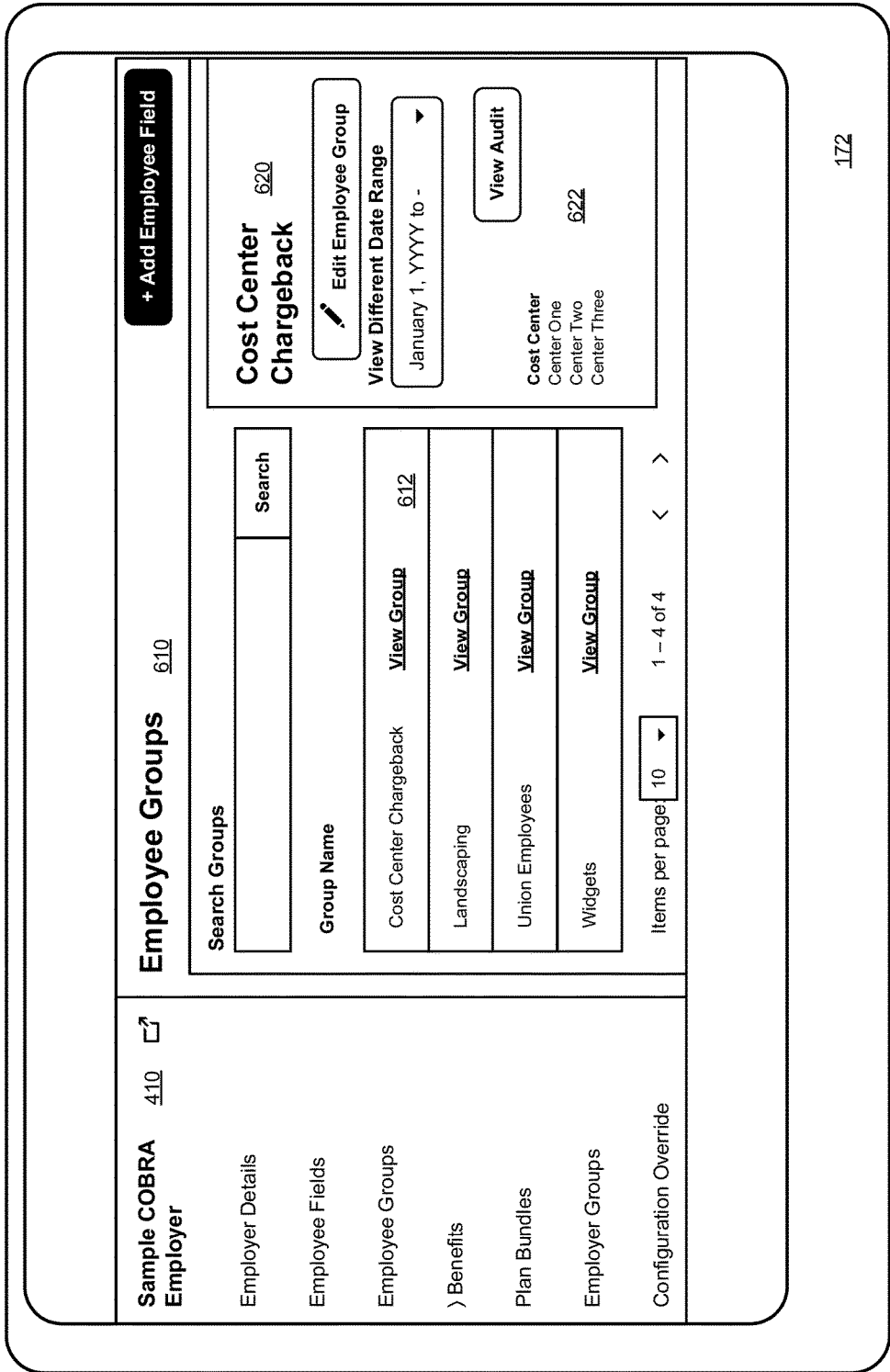
FIG. 6 depicts a user interface, in accordance with present implementations.

FIG. 6 depicts an example user interface, in accordance with present implementations. As illustrated by way of example in FIG. 6, an example user interface 600 can include at least a group summary presentation 610, and a provider group summary presentation 620.

The group summary presentation 610 can present one or more metrics corresponding to a plurality of groups selected at or active in the user interface 600. The group summary presentation 610 can include a provider group control affordance 612. The provider group control affordance 612 can receive input corresponding to a selection of a group object of the group control affordance 612. The provider group summary presentation 620 can present one or more metrics corresponding to an entity linked with the group object. The provider group summary presentation 620 can include a provider group metrics presentation 622. The provider group metrics presentation 622 can present metrics corresponding to one or more objects of an entity. For example, an entity object can correspond to an organization, and can include or reference further entity objects corresponding to subdivisions, departments, divisions, or the like, of the entity. For example, the group data processor 232 can obtain entity data from the administrator device via the network adapter 220, and can generate one or more entity objects. For example, the tree import processor can generate links between various entity objects according to a hierarchy of the entity.

Figure 7:
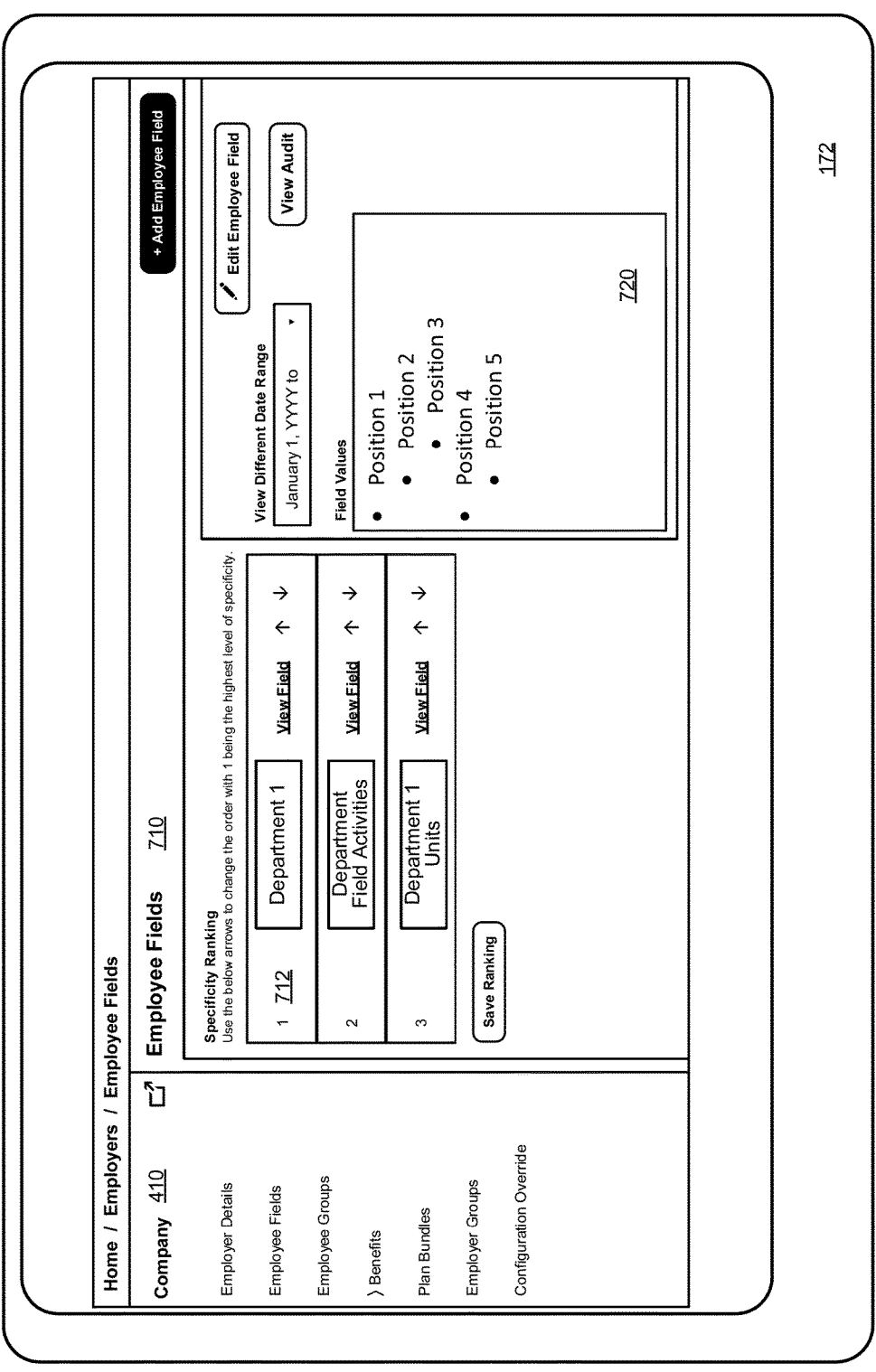
FIG. 7 depicts a user interface, in accordance with present implementations.

FIG. 7 depicts an example user interface, in accordance with present implementations. As illustrated by way of example in FIG. 7, an example user interface 700 can include at least a participant summary presentation 710, and a provider group hierarchy presentation 720.

The participant summary presentation 710 can present one or more metrics corresponding to a participant object and can present one or more control affordances to modify one or more metrics corresponding to a participant object. The participant summary presentation 710 can include a participant group link control affordance 712. The participant group link control affordance 712 can present one or more groups and can present one or more override control affordances associated with one or more corresponding groups. For example, the override control affordance associated with a first group of the participant group link control affordance 712 can receive input via the user interface 700 corresponding to a modification of an override ranking or override metric of a group. For example, the override control affordance can transmit an indication of a modification of an override metric of a group to lower the ranking of the group in absolute terms or with respect to one or more other groups associated with the participant group link control affordance 712 or a particular participant. In response, the plan hierarchy processor 330 can obtain the indication of modification, can modify the override for a group, and can generate a plan corresponding to the updated override for that group or that participant, or any combination thereof.

The provider group hierarchy presentation 720 can render a hierarchical presentation corresponding to the structure of one or more of a network object, a tree, an entity, a plurality of group objects corresponding to an entity, or any combination thereof. For example, the provider group hierarchy presentation 720 can present various subdivisions of an entity each having associations with various group objects. The participant summary presentation 710 can present groups at the participant group link control affordance 712 corresponding to the group objects associated with the hierarchical presentation of the provider group hierarchy presentation 720.

Figure 8:
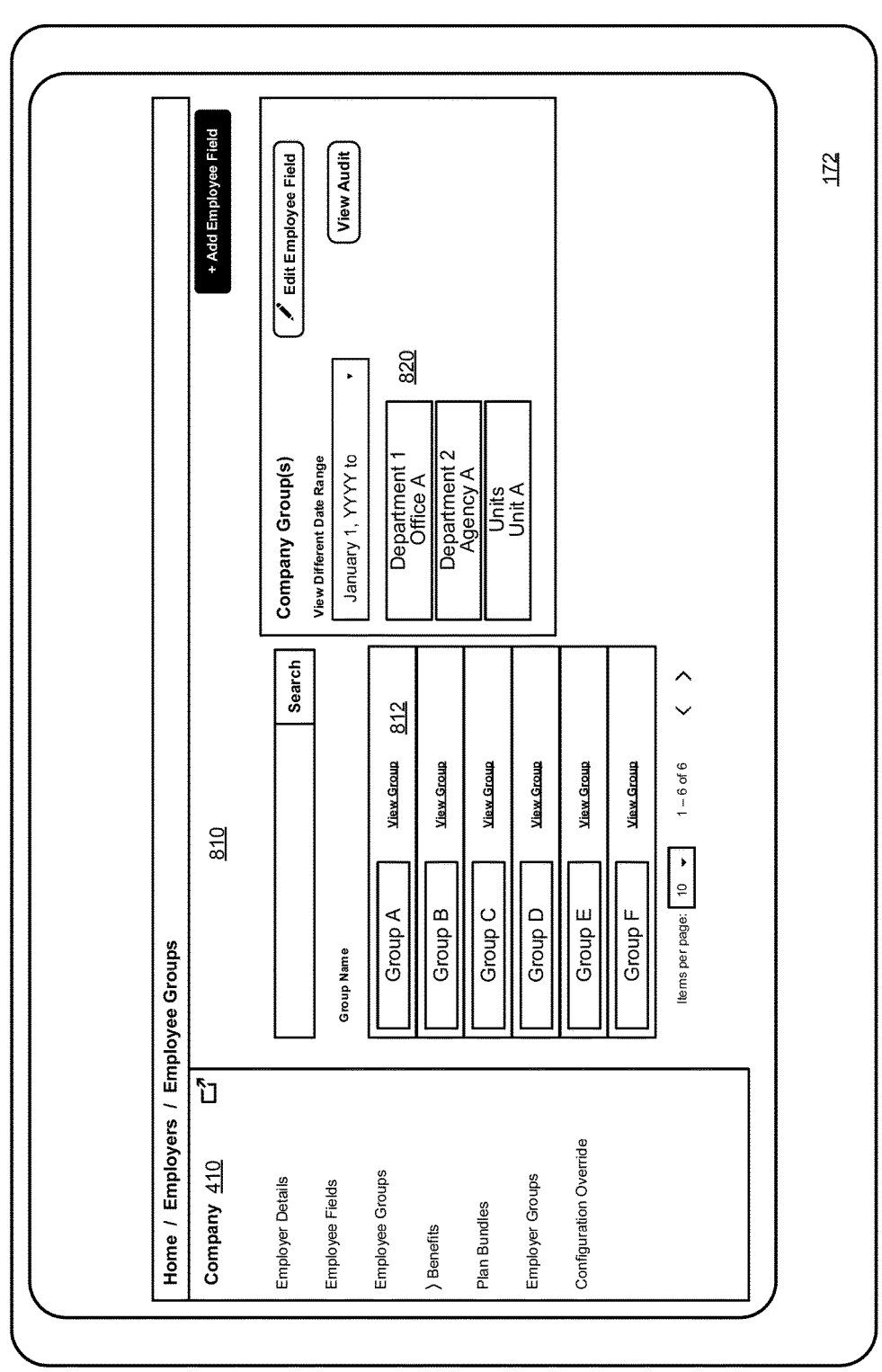
FIG. 8 depicts a user interface, in accordance with present implementations.

FIG. 8 depicts an example user interface, in accordance with present implementations. As illustrated by way of example in FIG. 8, an example user interface 800 can include at least a participant summary presentation 810, a participant group summary presentation 812, and a provider group summary presentation 820. The participant summary presentation 810 can present one or more metrics corresponding to a participant object and can present one or more control affordances to modify one or more metrics corresponding to a participant object. The participant group summary presentation 812 can present one or more groups corresponding to group objects associated with or linked with a particular entity and a particular participant. The provider group summary presentation 820 can present one or more entities or hierarchically linked portions of an entity corresponding to group objects associated with or linked with a particular entity and a particular participant.

Figure 9:
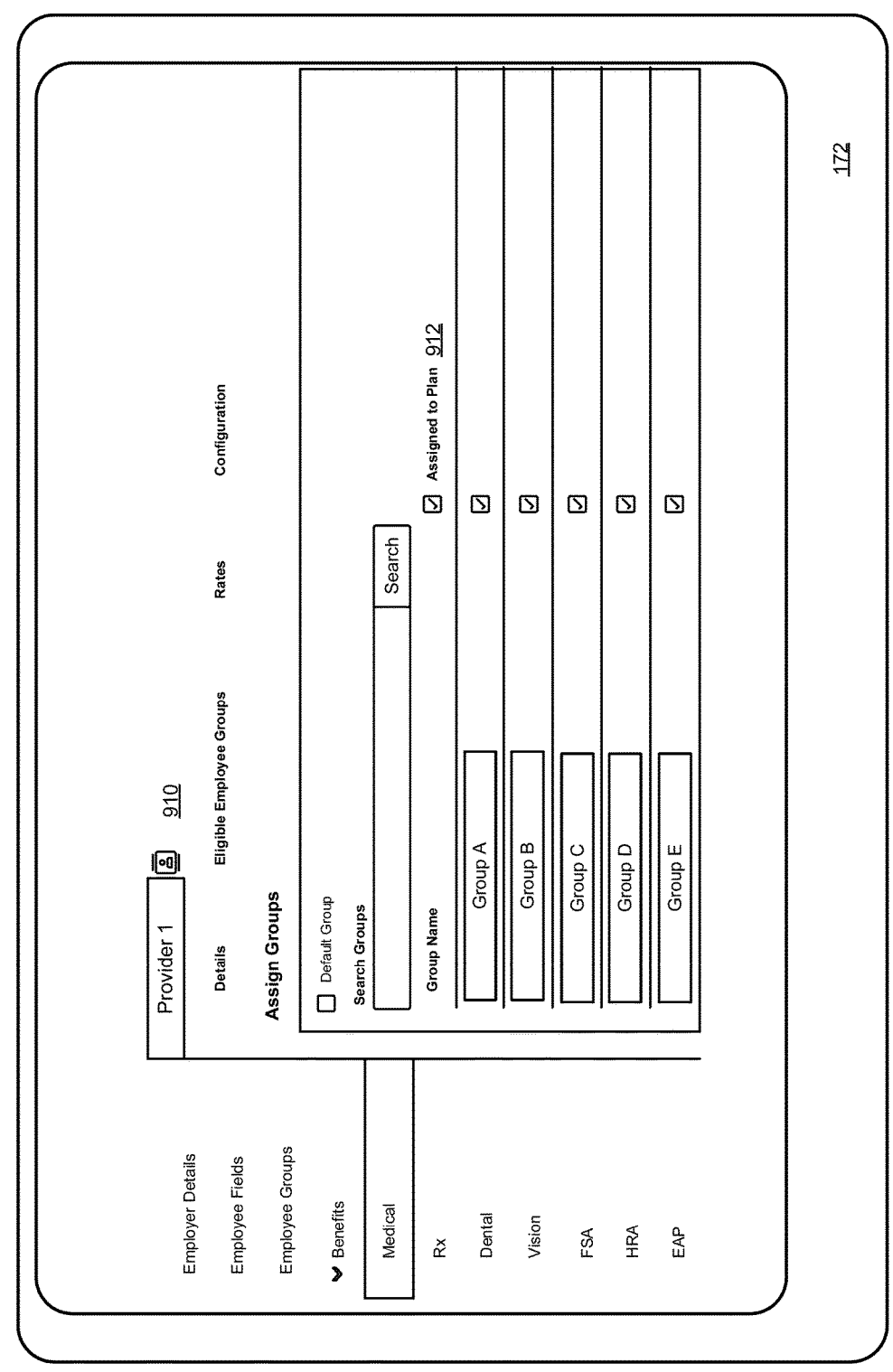
FIG. 9 depicts a user interface, in accordance with present implementations.

FIG. 9 depicts an example user interface, in accordance with present implementations. As illustrated by way of example in FIG. 9, an example user interface 900 can include at least a provider summary presentation 910.

The provider summary presentation 910 can present one or more groups corresponding to a particular entity. The provider summary presentation 910 can present groups in accordance with a filter to present a portion of groups corresponding to a particular group or plan classification as selected at an entity control affordance of the user interface 900. For example, the entity control affordance can correspond to a menu including one or more classification of groups. For example, a classification can correspond to a medical plan, a prescription (Rx) plan, a dental plan, a vision plan, a flexible savings account (FSA) plan, a health reimbursement arrangement (HRA) plan, an employee assistance plan (EAP), or any combination thereof. The provider summary presentation 910 can include a provider group control affordance 912.

The provider group control affordance 912 can include one or more control affordances each associated with a corresponding group object according to groups presented at the user interface 900. For example, the provider group control affordance 912 can include a plurality of check box affordances each operable to receive input to activate or deactivate a link between a particular group and a particular group or plan classification. For example, the plan hierarchy processor 330 can block or discard from use plans satisfying a heuristic corresponding to a plan classification link among groups selected by the group selector 312. Thus, the plan generator 340 can generate output with input corresponding to groups that satisfy a plan classification. In response to a modification of plan classification via the under interface 900, the Thus, the plan generator 340 can generate updated output with input corresponding to groups that satisfy one or more modified plan classifications.

Figure 10:
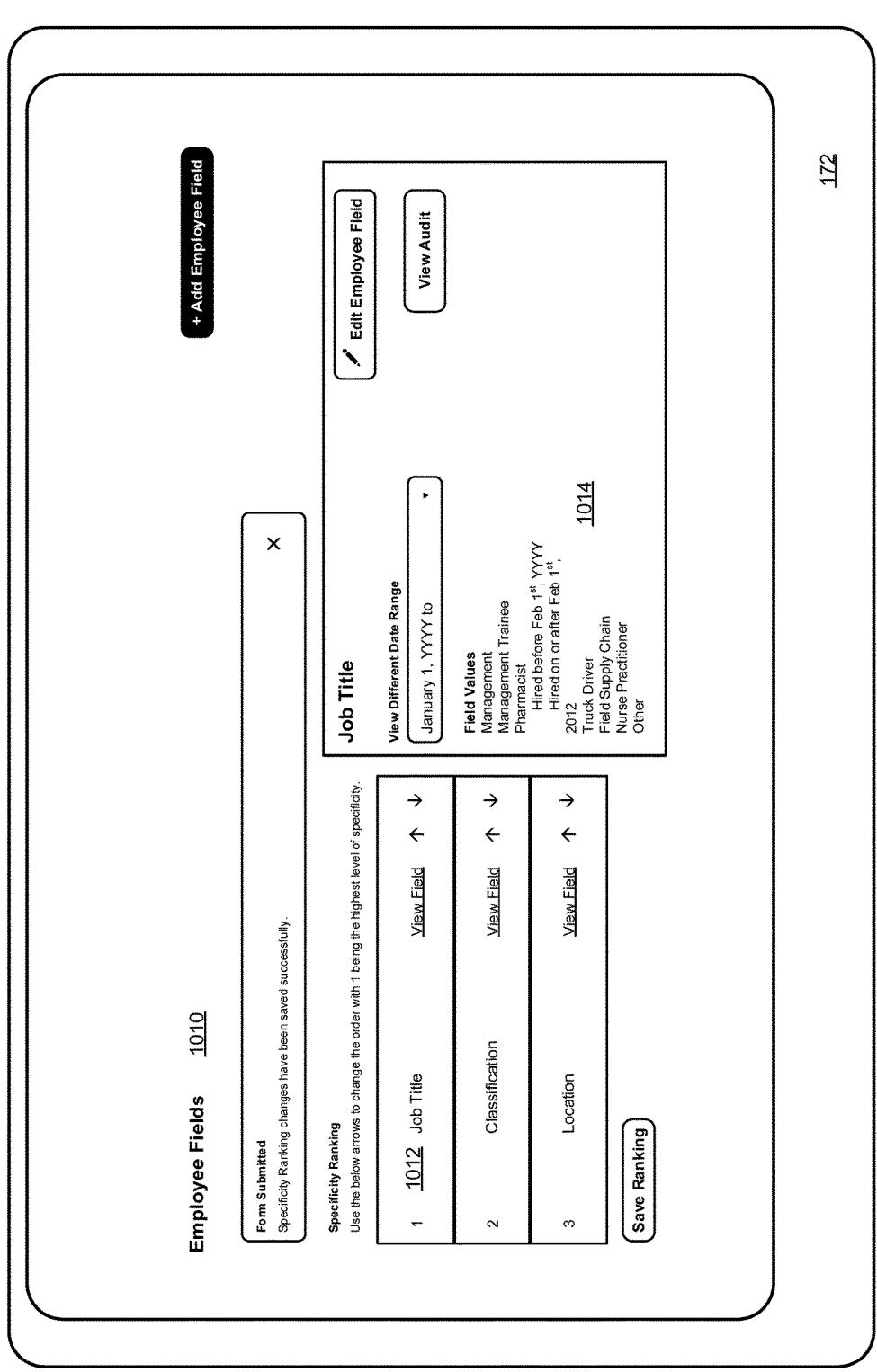
FIG. 10 depicts a user interface, in accordance with present implementations.

FIG. 10 depicts an example user interface, in accordance with present implementations. As illustrated by way of example in FIG. 10, an example user interface 1000 can include at least a participant summary presentation 1010. The participant summary presentation 1010 can present one or more metrics corresponding to a participant object and can present one or more control affordances to modify one or more metrics corresponding to a participant object. The participant summary presentation 1010 can include a participant metric control affordance 1012 and a participant metrics presentation 1014.

The participant metric control affordance 1012 can present one or more metrics linked with a participant and can present one or more override control affordances associated with one or more corresponding metrics. For example, the override control affordance associated with a first metric of the participant metric control affordance 1012 can receive input via the user interface 1000 corresponding to a modification of an override ranking or override metric of a participant. For example, the override control affordance can transmit an indication of a modification of an override metric of a participant to lower the ranking of the metric in absolute terms or with respect to one or more other metrics associated with the participant metric control affordance 1012 or a particular participant.

The participant metrics presentation 1014 can present one or more metrics of the participant corresponding to the participant summary presentation 1010. For example, a participant can correspond to an individual employee, former employee, contractor, or the like.

Figure 11:
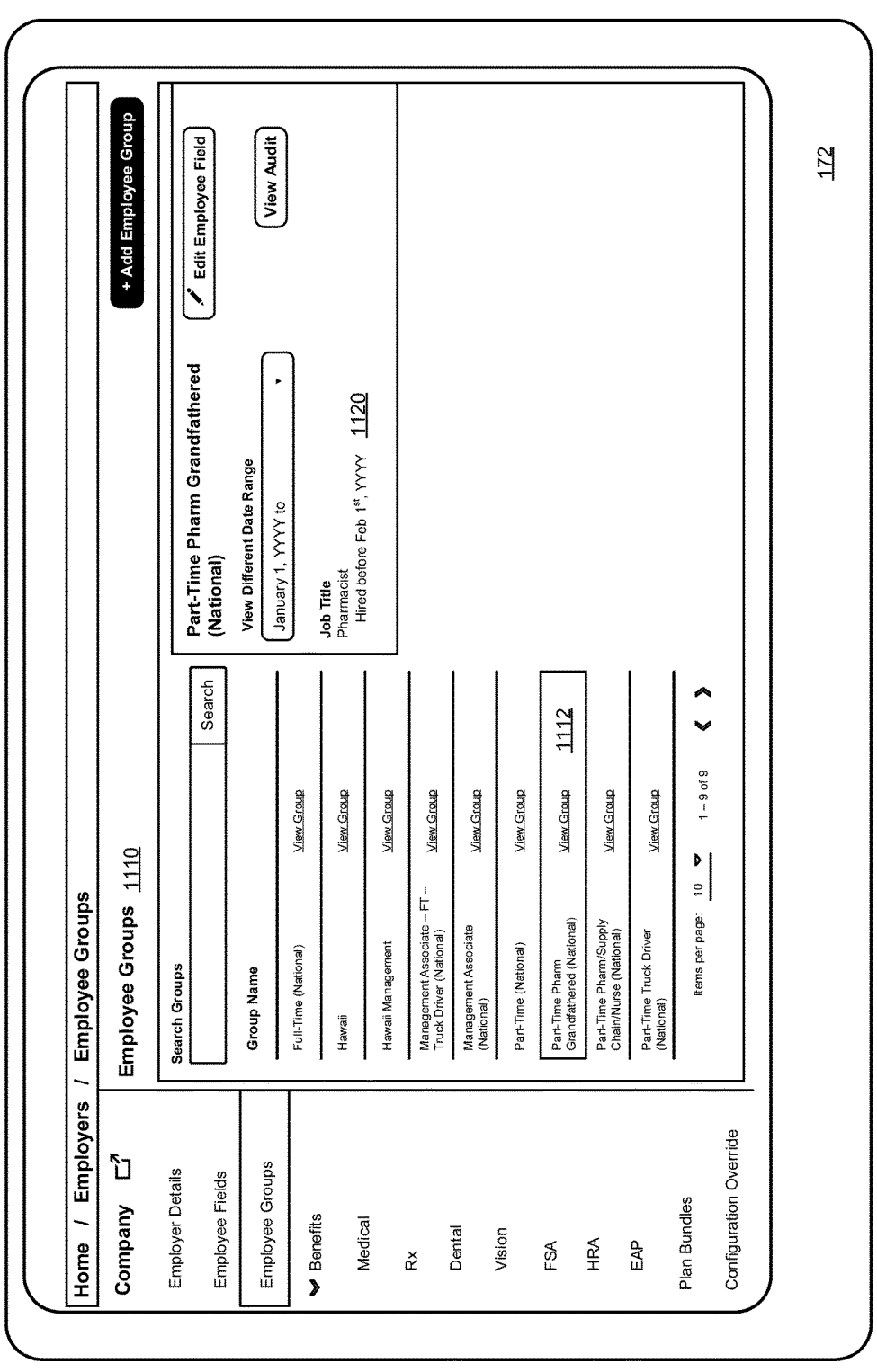
FIG. 11 depicts a user interface, in accordance with present implementations.

FIG. 11 depicts an example user interface, in accordance with present implementations. As illustrated by way of example in FIG. 11, an example user interface 1100 can include at least a participant summary presentation 1110, a provider group control affordance 1112, and a provider group hierarchy presentation 1120. The participant summary presentation 1110 can present one or more metrics corresponding to a participant object and can present one or more control affordances to modify one or more metrics corresponding to a participant object. The provider group control affordance 1112 can receive input corresponding to a selection of a group object of the provider group control affordance 1114. The provider group hierarchy presentation 1120 can present one or more metrics of the participant corresponding to a particular entity.

FIG. 12 depicts a method of generating dynamic associations based on user object attributes, in accordance with present implementations. At least one of the example system 100 and the user interfaces 200-900 can perform method 1200 according to present implementations. The method 1200 can begin at 1210. At 1210, the method can identify one or more attributes of a user object. 1210 can include 1212. At 1210, the method can identify one or more of a role attribute, a geography attribute, and a temporal attribute. The method 1200 can then continue to 1220. At 1220, the method can determine a benefits group corresponding to the user object based on the one or more attributes. 1220 can include 1222. At 1222, the method can determine a benefits group based on one or more of a role attribute, a geography attribute, and a temporal attribute. The method 1200 can then continue to 1230.

At 1230, the method can generate a dynamic association of the user object to the benefits group. 1230 can include at least one of steps 1232 and 1234. For example, a dynamic association can correspond to a link that can be modified in response to input at a user interface. At 1232, the method can generate a dynamic association one or more of a role attribute, a geography attribute, and a temporal attribute. At 1234, the method can generate a dynamic association modifiable based on or in response to a modification of one or more attributes. The method 1200 can then continue to 1240. At 1240, the method can generate a dynamic tree structure based on the dynamic association. 1240 can include 1242. At 1242, the method can generate a dynamic tree structure modifiable based on or in response to a modification of one or more attributes. The method 1200 can end at 1240.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system to generate a user object, the system comprising:

a data processing system comprising memory and one or more processors to:

establish, by a network adaptor and using a first secure protocol, a segmented and secure channel interface with an external system that is separate from the data processing system;

identify, via the segmented and secure channel interface using the first secure protocol, for a user object maintained on the external system, a role attribute of the user object, a geography attribute of the user object, and a temporal attribute of the user object, wherein the user object comprises at least one of a JSON object, a binary object, or a cryptographic token;

determine, based on the role attribute, the geography attribute, and the temporal attribute, a benefits group corresponding to the user object, wherein the determination comprises:

a determination that the geography attribute conflicts with the temporal attribute; and responsive to the determination that the geography attribute conflicts with the temporal attribute, resolution of the conflict based on application of a ranking between the geography attribute and the temporal attribute to cause the benefits group to be determined in accordance with the ranking;

generate, in a data structure maintained by the data processing system, a dynamic association of the user object to the benefits group, wherein the dynamic association is based on the role attribute, the geography attribute, and the temporal attribute, and the dynamic association is modifiable in response to modification of one or more of the role attribute, the geography attribute, and the temporal attribute;

generate, in the data structure, a dynamic tree structure comprising a hierarchical structure based on the dynamic association, the dynamic tree structure modifiable in response to modification of one or more of the role attribute, the geography attribute, and the temporal attribute; and transmit, via a second secure protocol different from the first protocol, for display on a display device via a graphical user interface, the dynamic tree structure with an override control affordance associated with the benefits group, wherein the override control affordance is configured to detect an interaction that causes a modification to the hierarchical structure of the dynamic tree structure.

2. The system of claim 1, the data processing system to:

modify the dynamic association, in response to a determination that the role attribute does not satisfy the geography attribute; and modify the dynamic tree structure, in response to the determination that the role attribute does not satisfy the geography attribute.

3. The system of claim 1, the data processing system to:

modify the dynamic association, in response to a determination that the role attribute does not satisfy the temporal attribute; and modify the dynamic tree structure, in response to the determination that the role attribute does not satisfy the temporal attribute.

4. The system of claim 1, the role attribute corresponding to an employee classification.

5. The system of claim 1, the role attribute corresponding to a union classification.

6. The system of claim 1, the geography attribute corresponding to a government jurisdiction.

7. The system of claim 1, the temporal attribute corresponding to an effective date of a benefit year associated with the benefits group.

8. The system of claim 1, the temporal attribute corresponding to an effective date of legislation associated with the benefits group.

9. The system of claim 1, the data processing system to:

identify a first rank associated with the geography attribute and a second rank associated with the temporal attribute, in response to the determination that the geography attribute conflicts with the temporal attribute;

modify the dynamic association in accordance with the geography attribute, in response to a determination that the first rank is greater than the second rank; and modify the dynamic tree structure in accordance with the geography attribute, in response to the determination that the first rank is greater than the second rank.

10. The system of claim 9, the data processing system to:

modify the dynamic association in accordance with the temporal attribute, in response to a determination that the first rank is not greater than the second rank; and modify the dynamic tree structure in accordance with the temporal attribute, in response to the determination that the first rank is not greater than the second rank.

11. The system of claim 1, the data processing system to:

identify a first rank associated with the geography attribute and a second rank associated with a second geography attribute of the user object, in response to a determination that the geography attribute conflicts with the second geography attribute;

modify the dynamic association in accordance with the geography attribute, in response to a determination that the first rank is greater than the second rank; and modify the dynamic tree structure in accordance with the geography attribute, in response to the determination that the first rank is greater than the second rank.

12. The system of claim 11, the data processing system to:

modify the dynamic association in accordance with the second geography attribute, in response to a determination that the first rank is not greater than the second rank; and modify the dynamic tree structure in accordance with the second geography attribute, in response to the determination that the first rank is not greater than the second rank.

13. A method to generate a user object, the method comprising:

establishing, by one or more processors, coupled with memory, via a network adaptor and using a first secure protocol, a segmented and secure channel interface with an external system that is separate from the data processing system;

identifying, by the one or more processors, via the segmented and secure channel interface using the first secure protocol, for a user object maintained on the external system, a role attribute of the user object, a geography attribute of the user object, and a temporal attribute of the user object, wherein the user object comprises at least one of a JSON object, a binary object, or a cryptographic token;

determining, by the one or more processors, based on the role attribute, the geography attribute, and the temporal attribute, a benefits group corresponding to the user object, wherein the determination comprises:

determining that the geography attribute conflicts with the temporal attribute; and responsive to the determination that the geography attribute conflicts with the temporal attribute, resolving the conflict based on application of a ranking between the geography attribute and the temporal attribute to cause the benefits group to be determined in accordance with the ranking;

generating, by the one or more processors, in a data structure, a dynamic association of the user object to the benefits group, the dynamic association based on the role attribute, the geography attribute, and the temporal attribute, and modifiable in response to a modification of one or more of the role attribute, the geography attribute, and the temporal attribute; and generating, by the one or more processors, in the data structure, a dynamic tree structure comprising a hierarchical structure based on the dynamic association, the dynamic tree structure modifiable in response to modification of one or more of the role attribute, the geography attribute, and the temporal attribute; and transmitting, by the one or more processors, via a second secure protocol different from the first protocol, for display on a display device via a graphical user interface, the dynamic tree structure with an override control affordance associated with the benefits group, wherein the override control affordance is configured to detect an interaction that causes a modification to the hierarchical structure of the dynamic tree structure.

14. The method of claim 13, further comprising:

modifying the dynamic association, in response to a determination that the role attribute does not satisfy the geography attribute; and modifying the dynamic tree structure, in response to the determination that the role attribute does not satisfy the geography attribute.

15. The method of claim 13, further comprising:

modifying the dynamic association, in response to a determination that the role attribute does not satisfy the temporal attribute; and modifying the dynamic tree structure, in response to the determination that the role attribute does not satisfy the temporal attribute.

16. The method of claim 13, further comprising:

identifying a first rank associated with the geography attribute and a second rank associated with the temporal attribute, in response to the determination that the geography attribute conflicts with the temporal attribute;

modifying the dynamic association in accordance with the geography attribute, in response to a determination that the first rank is greater than the second rank; and modifying the dynamic tree structure in accordance with the geography attribute, in response to the determination that the first rank is greater than the second rank.

17. The method of claim 16, further comprising:

modifying the dynamic association in accordance with the temporal attribute, in response to a determination that the first rank is not greater than the second rank; and modifying the dynamic tree structure in accordance with the temporal attribute, in response to the determination that the first rank is not greater than the second rank.

18. The method of claim 13, further comprising:

identifying a first rank associated with the geography attribute and a second rank associated with a second geography attribute of the user object, in response to a determination that the geography attribute conflicts with the second geography attribute;

modifying the dynamic association in accordance with the geography attribute, in response to a determination that the first rank is greater than the second rank; and modifying the dynamic tree structure in accordance with the geography attribute, in response to the determination that the first rank is greater than the second rank.

19. The method of claim 18, further comprising:

modifying the dynamic association in accordance with the second geography attribute, in response to a determination that the first rank is not greater than the second rank; and modifying the dynamic tree structure in accordance with the second geography attribute, in response to the determination that the first rank is not greater than the second rank.

20. A non-transitory computer readable medium including one or more instructions stored thereon and executable by a processor to:

establish, by the processor, via a network adaptor and using a first secure protocol, a segmented and secure channel interface with an external system that is separate from the data processing system;

identify, by the processor, via the segmented and secure channel interface using the first secure protocol, for a user object maintained on the external system, a role attribute of the user object, a geography attribute of the user object, and a temporal attribute of the user object, wherein the user object comprises at least one of a JSON object, a binary object, or a cryptographic token;

determine, by the processor, based on the role attribute, the geography attribute, and the temporal attribute, a benefits group corresponding to the user object, wherein the determination comprises:

a determination that the geography attribute conflicts with the temporal attribute; and responsive to the determination that the geography attribute conflicts with the temporal attribute, resolution of the conflict based on application of a ranking between the geography attribute and the temporal attribute to cause the benefits group to be determined in accordance with the ranking;

generate, by the processor, in a data structure maintained by the data processing system, a dynamic association of the user object to the benefits group, wherein the dynamic association is based on the role attribute, the geography attribute, and the temporal attribute, and the dynamic association is modifiable in response to modification of one or more of the role attribute, the geography attribute, and the temporal attribute;

generate, by the processor, in the data structure, a dynamic tree structure comprising a hierarchical structure based on the dynamic association, the dynamic tree structure modifiable in response to modification of one or more of the role attribute, the geography attribute, and the temporal attribute; and transmit, by the processor, via a second secure protocol different from the first protocol, for display on a display device via a graphical user interface, the dynamic tree structure with an override control affordance associated with the benefits group, wherein the override control affordance is configured to detect an interaction that causes a modification to the hierarchical structure of the dynamic tree structure.

* * * * *